Jan. 6, 1942.    J. J. PELOUCH    2,268,898
FLUID MOTOR
Filed May 6, 1938    2 Sheets-Sheet 1
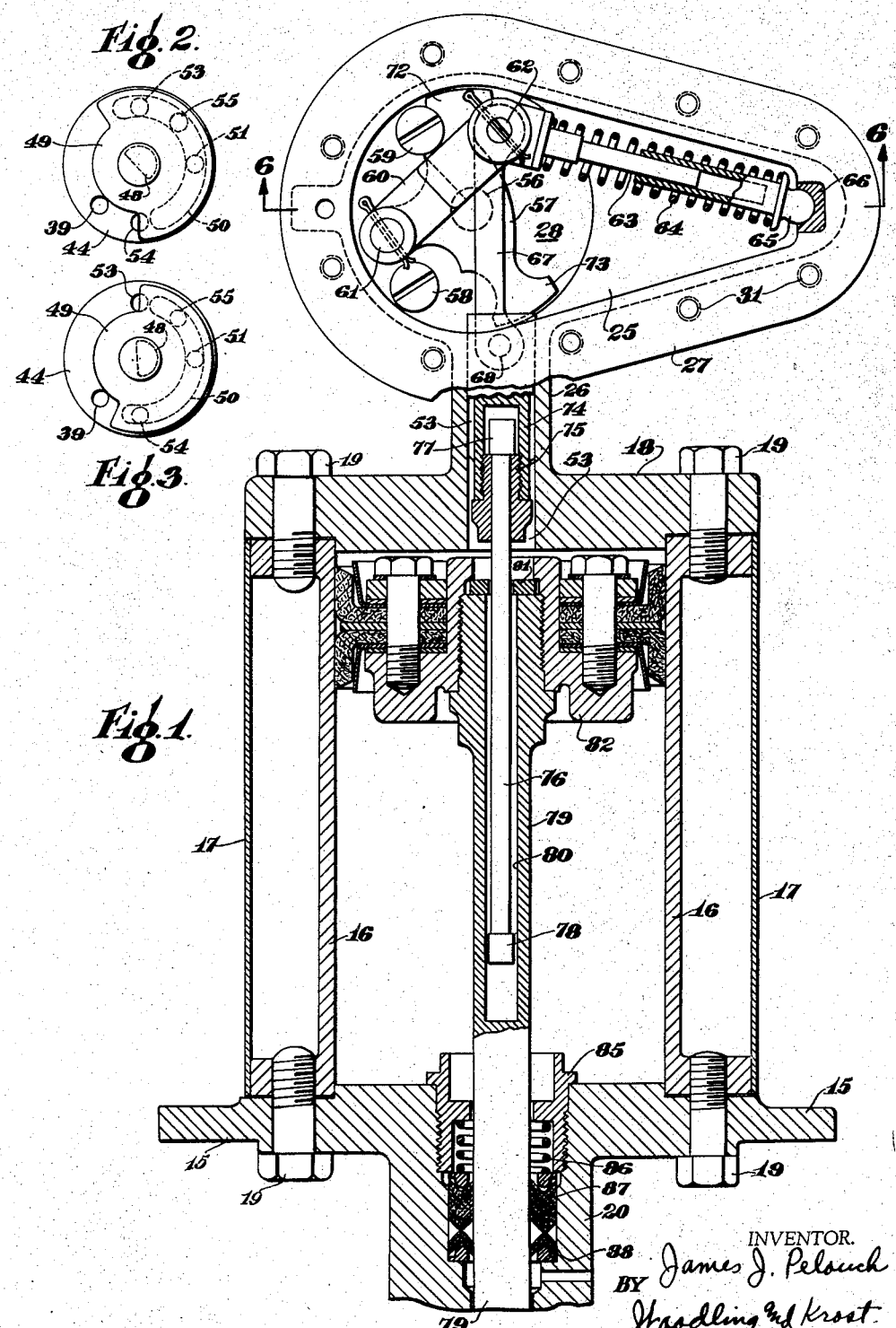
INVENTOR.
James J. Pelouch
BY Hoodling and Krost
ATTORNEY.

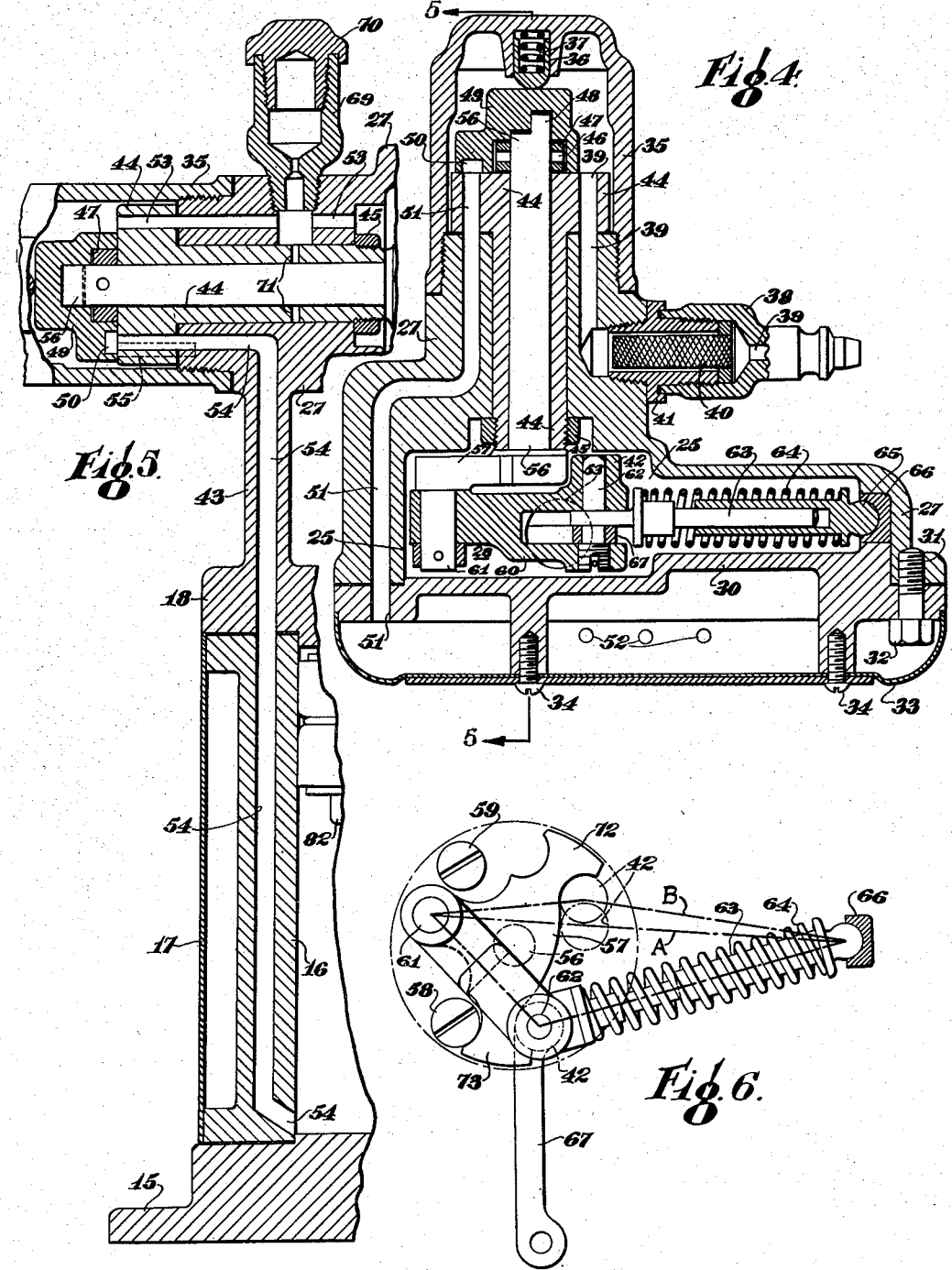

Patented Jan. 6, 1942

2,268,898

UNITED STATES PATENT OFFICE 2,268,898

FLUID MOTOR

James J. Pelouch, Cleveland, Ohio, assignor to The United States Air Compressor Company, a corporation of Ohio Application May 6, 1938, Serial No. 206,409

12 Claims. (Cl. 121—164)

My invention relates to a fluid motor and valve assembly and more particularly to a fluid motor and valve assembly for operating pumping devices for pumping fluid from a container.

An object of my invention is to provide for operating a pumping device by compressed air or other compressed fluid and governed by a valve arrangement actuated by the movements of the pumping device.

Another object is to provide a valve arrangement responsive to the operating position of a pumping device for controlling the movements of the pumping device.

Another object is to provide a valve assembly for delivering compressed air to alternate sides of the piston of an air motor and simultaneously releasing the air on the opposite side of the piston so as to reciprocate the piston of the air motor.

Another object of my invention is to provide for operating a valve by a toggle arrangement.

Another object of my invention is to provide for causing the toggle arrangement to swing beyond its "snap over" or meridian position before actuating the valve.

Another object of my invention is to insure the positive operation of the valve by the toggle arrangement.

Another object is to provide a valve assembly and air motor operatively connected together by connecting means mounted in an air conduit leading from the valve assembly to the air motor.

Another object is to provide for enclosing an air motor and valve assembly in a housing which seals the operating connection between the air motor and valve assembly therein.

Another object is to provide an air motor having a reciprocating plunger extending therefrom through a sliding seal and having connecting means extending from the piston to a valve assembly mounted in a conduit leading from the air motor to the valve assembly.

Another object of my invention is to incorporate all the seals between the relatively movable parts which must be sealed against differential pressures in the valve, except the piston seal which divides the two chambers of the cylinder and the pump plunger seal between the lower cylinder chamber and atmosphere.

Other objects and a fuller understanding of my invention may be had by referring to the following description and claims, taken in conjunction with the accompanying drawings, in which:

Figure 1 is a fragmentary and cross-sectional view taken lengthwise and vertically of my air motor and valve assembly;

Figure 2 illustrates the rotary air valve parts of the valve assembly in one operating position;

Figure 3 illustrates the rotary air valve parts shown in Figure 2 in the other operating position;

Figure 4 is a horizontal cross-sectional view of the valve housing and valve assembly taken along the line 6—6 of Figure 1 and cross-wise of the view shown in Figure 1;

Figure 5 is a fragmentary cross-sectional view taken lengthwise and vertically of my air motor and valve assembly, showing the rear portion of the valve housing and valve assembly, together with the rear portion of the air motor and disposed in a plane at right angles to the plane of the drawing in Figure 1 along the line 5—5 of Figure 4; and Figure 6 is a detailed view showing the arrangement of the toggle arrangement of the valve assembly of Figure 1 and shows the toggle arrangement in the other operating position.

My air motor is particularly adapted to operate a pump arranged to be mounted to or mounted over a fluid container having an opening in the top thereof so that the lower end of the pump extends down into the container for the pumping of the fluid therefrom. This method of pumping fluid is especially used when grease or other lubricating fluid is to be withdrawn from the fluid container and applied to the parts to be lubricated, the fluid after leaving the pumping device, passing through a hose attached thereto having a suitable nozzle attached to the end thereof. The motive fluid for operating the air motor of the pumping device may be compressed air, but it is understood that any other fluid may be used in the place of compressed air and the term "compressed air" used herein is to be understood as including any other fluid having the desirable characteristics.

With reference to Figures 1, 4 and 5, the entire housing of my air motor comprises generally an air cylinder 16 having a top plate 18, a valve assembly head 27, a chevron casing member 20, and a piston 82 reciprocally mounted in the cylinder 16. The casing member 20 has a ledge portion 15 extending therefrom and this ledge portion is adapted to be mounted to a suitable support for supporting the housing in proper position relative to the fluid container so that the pump operated by the piston 82 and positioned below the ledge 15 is directed downwardly into the container. The cylinder 16 of the air motor is secured to the ledge 15 and to the top plate 18 by means of the screw bolts 19 so that an enclosed air cylinder is provided. A cylindrical metal cover 17 is secured by suitable means to the cylinder wall 16 to provide good appearing and round outside surface to the air motor.

There is a conduit neck 26 extending upwardly from the top plate 18 and integral therewith, and the upper portion of the neck is enlarged to form the valve assembly head 27. The head 27 has a hollow open space 25 therein and there is a conduit 53 extending through the neck 26 to provide air communication between the open space 25 and the interior of the upper end of the air cylinder.

The valve assembly denoted generally by the reference character 28 is mounted within the head 27. Reference is made to Figures 1, 2, 3, 4, 5, and 6 in describing the structure of the valve assembly and its mounting within the head 27. A plate 30 secured to the head 27 by means of a plurality of bolts 32 encloses the hollow opening 25, and seals the valve assembly 28 within the hollow opening 25. Therefore, the upper portion of the air cylinder of the air motor is in air communication with the enclosed opening 25. A metal cover 33 having rounded edge portions is in turn secured over the plate 30 by means of the screw bolts 34 and forms an enclosure between the plate 30 and the cover 33. There are a plurality of openings 52 in the cover 33 which provide communication therefrom to atmosphere.

A T-shaped stationary valve or seat member 44 having a hard end valve face is mounted in the head 27 by securing the stem portion thereof rigidly to the head 27 with a jam nut 45. A rock shaft 56 is rotatably mounted within an opening extending through the stationary valve member 44 and is held in position endwise by a thrust bushing 47 secured to the end thereof by means of a pin 46 passing cross-wise through the rock shaft 56. The outer end of the rock shaft 56 is cut away to form a non-circular engaging portion 48. A rotating valve member 49 having a complementary socket portion is fitted over the non-circular end of the rock shaft 56 so that the valve member 49 rotates with the rotation of the rock shaft 56.

The stationary valve or seat member 44 has a hard flat ground surface against which a hard ground surface of the rotating valve member 49 rotatably slides in close engagement so that there is a good tight seal between the stationary valve member 44 and the rotary valve member 49. By reference to Figures 2, 3, 4 and 5, it is seen that there are four openings provided in the stationary valve member 44 and they extend to the flat ground surface thereof. The rotary valve member 49 has a portion cut away so that a selected two of the four openings may be covered by the rotary valve member 49 while the other two are uncovered. There is a groove or channel 50 extending in arcuate form in the surface of the rotary valve member 49 next adjacent to the flat ground surface of the seat member 44. This channel 50 has closed ends so that there is a sealed enclosure between the rotary valve member 49 and the stationary valve member 44. A locating pin 55 extending rearwardly from the stationary valve member 44 and projecting into the casing head 27 is useful in locating the stationary valve member 44 in its proper position. It is seen by referring to Figures 2 and 3 that when the rotary valve member 49 is rotated into one position, two of the openings are uncovered and the other two of the openings are covered by the valve member 49, but are in communication with each other through the groove 50. When the rotary valve member 49 is rotated in its other position, then another selected pair of openings are uncovered and the other pair are in communication with each other through the channel 50. One of the positions is illustrated in Figure 2 and the other position is illustrated in Figure 3. Opening 39 is a conduit in communication with a source of compressed air. Opening 53 is a conduit in communication with the upper end of the air cylinder of the air motor. Opening 51 is a conduit in communication with atmosphere. Opening 54 is a conduit in communication with the bottom of the air cylinder of the air motor. Therefore, in the position illustrated in Figure 2, conduits 39 and 54 being uncovered are in communication with each other and conduits 53 and 51 being connected by the channel 50 are in communication with each other. In the position shown in Figure 3, openings 39 and 53 being uncovered are in communication with each other and openings 51 and 54 being connected by the channel 50 are in communication with each other.

The rear end of the head 27 is closed and sealed by a cup 35 threadably engaged thereto. There is a boss 36 slidably engaged in a recess formed in the end of the cup 35 and a small coil spring 37 within the recess resiliently presses upon the boss 36. By turning the cup 35 so as to threadably screw it down in close engagement with the head 27, the boss 36 resiliently presses against the end of the rotary valve member 49 and thus holds the valve member 49 in close engagement with the stationary valve member 44 against which it rotates. The interior of the cup 35 secured to the head 27 forms an enclosure so that the two selected openings not covered by the rotary valve member 29 are maintained in communication with each other.

Compressed air from a suitable source is introduced into the head 27 by means of a nozzle 38 engaged thereto by a threaded nipple portion 41. This nozzle member 38 has a screen 40 which cleans the compressed air as it enters the head 27 through the conduit 39. When the compressed air fills the enclosure of the cup 35, the pressure built-up therein biases the rotary valve 49 against the valve seat 44. In addition to controlling the flow of the air through the registering ducts, the valve constitutes an air seal between all relatively movable parts which must be sealed against differential pressures, except the piston seal 82 between the upper and lower cylinder chambers and the plunger seal between the lower cylinder chamber and atmosphere. In other words, all the seals have been incorporated in the valve.

The conduit 53 extends back through the stationary valve member 44 and the head 27, and communicates with the hollow opening 25 of the head 27. From the hollow opening 25 the conduit 53 extends down through the neck 26 to communicate with the top of the cylinder of the air motor. The path of the conduit 53 is best seen in Figures 5, 4 and 1, in the order listed.

The conduit 51 extends through the stationary valve member 44 and the head 25, and opens up into the enclosure between the plate 30 and the cover 33 which is open to the atmosphere through the small holes 52. The communication of the conduit 51 with atmosphere is illustrated in Figure 4.

The conduit 54 extends through the stationary valve member 44 and the head 27, and down through the connecting portion 43 and the cylinder wall 16 to the bottom of the cylinder of the air motor. The communication of the conduit 54 with the bottom of the cylinder is better illustrated in Figure 5. The connecting portion 43 extends substantially parallel to the neck 26 shown in Figure 1 and is in the rear thereof.

Lubrication of the bearing parts of the valve assembly is provided by the oil cup 69 mounted to the top of the head 27 and in communication with the conduit 53. Oil placed within the cup 69 flows down therethrough to the ducts 71 and lubricates the rock shaft 56. The oil also works along the conduit 53 and to the other conduits to lubricate the moving parts of the valve assembly. The oil is also atomized and carried by the air throughout the whole air motor. A cover 70 securely engaged to the oil cup 69 prevents the oil or air from escaping to atmosphere.

A toggle arrangement is utilized for rocking the rock shaft 56 so that the rotary valve member 49 is rotated positively from one position to another, one of the positions being shown in Figure 2 and the other position being shown in Figure 3. The inner end of the rock shaft 56 is formed into a bell crank 57 having two side arms 72 and 73 positioned in the open space 25 in the head 27. When in one position shown in Figure 1, the upper side arm 72 engages against a stop 59 and when in the other position shown in Figure 6, the other side arm 73 engages against a stop 58. The stops 58 and 59 are bolts threadably engaged to the head 27 and are positioned to limit the swinging or rocking movement of the bell crank 57. An arm 60 having a fixed length and constituting part of the toggle assembly has one end pivotally connected to the rearward portion of the bell crank 57 by means of a bearing pin 61. The other end of the arm 60 is pivotally connected to an arm 63 by a hinged pivot pin 62. The arm 63 of the toggle assembly is of variable length and has a coil spring 64 mounted in conjunction therewith to resiliently hold the arm 63 in its most extended position. The other end of the arm 63 has a bearing 65 which is adapted to pivot within a socket 66 secured to the head 27. A connecting link 67 is also journalled upon the pin 62 between the forked sides of the arm 60. It is seen from the arrangement as illustrated in Figure 1 that the swing pivot pin 61 swings to either side of the rock shaft 56 so that when the toggle is moved into one position, the position illustrated in Figure 1, the swing pivot pin 61 is below the rock shaft 56 and when the toggle is moved to the other position, the position illustrated in Figure 6, the swing pivot pin 61 is positioned above the rock shaft. Therefore, by moving the link 67 downwardly the toggle assembly is shifted into one definite position and by moving the link 67 upwardly the toggle assembly is shifted into the other definite position. The resiliency of the spring 64 resiliently holds the bell crank 57 in one position or the other, and the described positioning of the parts does not permit the swinging of the bell crank 57 to be stopped in any intermediate position, because just as soon as the off-center position is reached, the resiliency of the spring 64 snaps the toggle to the other position.

In Figure 6, the hinged pivot pin 62 is in its lowermost position, and the side arm 73 is engaging the stop 58 and holding the rotary valve member 49 in the position shown in Figure 2.

As the connecting link 67 moves the hinged pivot pin 62 upwardly, it approaches its "snap-over" or meridian position which is in the neighborhood of the dash and dot line A. Upon the upward movement of the toggle, when the dash and dot line between the pivot 61 and the pivot 62 assumes a position above the axial center of the rock shaft 56, there is an urging force tending to rotate the bell crank 57 in a counter-clockwise direction and to cause the pivot 61 to move slightly downwardly. As the toggle is further moved upwardly the arrangement assumes a position in the neighborhood of the dash and dot line A, except as modified by the slightly downward movement of the pivot 61. The movements occur so quickly that the dash and dot line A may be referred to as the "snap-over" or meridian position. The slight downward movement of the pivot 61 does not move the rotary valve 49 sufficiently to change the registering of the ducts. Therefore, the registering of the ducts remain fixed in one position until the toggle snaps over. As the connecting link 67 moves the hinged pivot pin 61 slightly beyond the meridian position, the toggle arrangement snaps upwardly. During the initial stages of the upwardly moving snap action beyond the meridian line A, the bell crank 57 remains substantially in the position shown in Figure 6 until the hinged pivot pin 62 reaches the position indicated by the reference character B. At the position B, a boss 42 in rear of and surrounding the hinged pin 62 engages the forward edge of the upper side arm 72 and causes the bell crank 57 to snap quickly to the position shown in Figure 1. In the foregoing action, the toggle arrangement swings beyond its meridian or "snap-over" position before actuating the valve. This insures that the valve is positively operated and avoids the possibility of the valve becoming arrested on "dead center" because the toggle arrangement is well beyond its meridian position before it starts to actuate the rotary valve member 49. The urging force of the toggle arrangement is accentuated when it starts to move the rotary valve 49 for the reason that the swinging pivot point 61 moves downwardly immediately when the boss engages the forward edge of the upper arm 72 and thereby decreases the included angle of the toggle arrangement. The operation of the toggle arrangement for the downward movement is exactly the same as that described with reference to the upward movement.

The bottom end of the link 67 is secured by a pin 68 to a guide member 74 which is loosely and slidably positioned within the opening in the neck 26. The guide member 74 has slits along its sides so as to allow communication of air between the hollow opening 25 in the head 27 and the upper end of the air cylinder of the air motor.

The guide member 74 has a hollow opening within which is positioned an enlarged head 77 of the upper end of a connecting rod 76 which is also mechanically secured to the guide member 74 by a threaded member 75 which slidably receives the connecting rod 76. In this manner the enlarged head 77 is fastened within the open space in the guide member 74. The open space in the guide member 74 is somewhat larger than the head 77 to permit a limited amount of play between the connecting rod 76 and the guide member 74. It is seen from the drawing of Figure 1 that upward movement of the connecting rod 76 raises the link 67 to operate the toggle in the direction shown in Figure 1 and that downward movement of the connecting rod 76 lowers the link 67 to operate the toggle in the direction shown in Figure 6. The actuation of the connecting rod 76 is governed by the movements of the piston 82 reciprocally mounted in the cylinder 16.

The piston 82 is of general construction and has suitable washer elements mounted thereto so that it makes a good seal with the inner wall of the cylinder 16 in both upward and downward movement, thereby dividing the air cylinder into a portion above the piston 82 and a portion below the piston 82 for double acting duty.

Threadably secured to the piston 82 is a plunger 79 which is disposed axially within the air cylinder and arranged to actuate the pump below. There is a cylindrical open space 80 disposed within the upper end of the plunger 79 and the connecting rod 76 is disposed within this open space 80 so as to be free to slide relative thereto. An enlarged head 78 on the bottom end of the connecting rod 76 is secured within the open space 80 by means of an annular stop washer 81 floatingly secured between a shoulder of the piston 82 and the plunger 79. The opening in the annular stop washer 81 is large enough to permit the connecting rod 76 to freely slide therethrough but is not large enough to permit the head 78 to pass therethrough. In this way the connecting rod 76 is operated only upon substantially the upper and lower limits of the movement of the piston 82. As the head 78 is engaged against the annular stop washer 81, the connecting rod 76 is drawn down with the downward movement of the plunger 79 until it operates the toggle. As the head 78 is engaged against the bottom of the open space 80, the connecting rod 76 is drawn up with the upward movement of the plunger 79 until it operates the toggle in the opposite direction. The relative length of the connecting rod 76 and the length of the opening 80 is such that the connecting rod 76 is moved by the plunger 79 only upon the piston approaching the limits of its reciprocal movements.

The movement of the rotary valve member 49 operated by the toggle assembly is therefore responsive to the operating position of the piston 82, so that the several conduits are placed in and out of communication in accordance with the position of the piston 82 and the plunger 79 carried thereby. Upon the piston 82 approaching the upper limit of its reciprocal movement, the rotary valve member 49 is shifted to the position shown in Figure 3 so that compressed air is delivered from the nozzle member 38, through the conduit 39, and the conduit 53 to the upper portion of the air cylinder above the piston 82 and so that the air in the lower portion of the air cylinder 83 is vented out through the conduit 54, the channel 50, and the conduit 51 to atmosphere. As shown in Figure 3, the conduit 53 is substantially one-half closed while the conduit 54 is unrestricted. This offers a resistance to the flow of the compressed air into the cylinder and an unrestricted flow from the cylinder to atmosphere for insuring efficient operation. Upon the piston 82 approaching the lower limit of its reciprocal movement, the valve member 49 is shifted to the position shown in Figure 2 so that the air above the piston 82 is released out through the conduit 53, the channel 50 and the conduit 51 to atmosphere and so that compressed air is delivered from the nozzle member 38, through the conduit 39, and the conduit 54 to the bottom of the air cylinder below the piston 82. In Figure 2, the conduit 54 is substantially one-half closed while the conduit 53 is unrestricted. This offers a resistance to the flow of the compressed air into the cylinder and an unrestricted flow from the cylinder to atmosphere for insuring efficient operation. In this manner the air motor is operated so as to repeatedly reciprocate the piston 82 and to reciprocate the plunger 79 attached thereto for operating the pump below.

Since the plunger 79 moves between the air cylinder and the interior chamber of the pump housing through which fluid flows, it is necessary to provide sealing means in the casing member 20 for separating the compressed air from the fluid being pumped. The sealing means is in the form of chevron seals 87 and 88, positioned tightly against the plunger 79 so that air or fluid does not pass along the reciprocating plunger 79. The chevrons 87 are disposed at an angle in one direction and the chevrons 88 are disposed in the opposite direction, and in this manner forms a more perfect seal. The chevrons 87 prevent air from escaping down from the air cylinder and the chevrons 88 prevent fluid from escaping upwardly along the plunger 79 through the casing 20. The coil spring 86 held down tightly by the threaded plug 85 constrains the chevrons in good packing position to seal the bottom of the air cylinder. Suitable washer elements are superimposed above and below the chevrons 87 and 88 to hold them in a firm position.

Although I have described my invention with a certain degree of particularity, it is understood that the present disclosure has been made only by way of example and that numerous changes in the details of construction and the combination and arrangement of parts may be resorted to without departing from the spirit and the scope of the invention as hereinafter claimed.

I claim as my invention:

1. A fluid operated device and a valve mechanism therefor comprising, in combination, a cylinder, a piston reciprocally mounted in the cylinder, a valve for controlling the flow of fluid to and from opposite sides of the piston, said valve providing a restricted passage to the flow of fluid to the cylinder and an unrestricted passage to the flow of the fluid from the cylinder, said valve having a seat member and a valve member movable relative to each other, actuating means within one end of the cylinder and extending through the seat member for actuating the valve member relative to the seat member, said seat member and said valve member sealing the actuating member within the cylinder.

2. A valve mechanism comprising, in combination, a valve having a rotary part, a shaft for actuating the rotary part, crank means for actuating the shaft, stop means for limiting the rotary movements of the crank means, pivot means carried on the crank at a distance from and on one side of the shaft, bearing means positioned on the opposite side of the shaft, a spring biased toggle linkage including two parts hinged intermediate their ends, one end of the toggle linkage being pivotally connected to the pivot means and the other end of the toggle linkage bearing upon the bearing means, said crank means having spaced engaging means which are engaged by the toggle linkage for actuating the shaft and the rotary part of the valve.

3. A valve mechanism comprising, in combination, a movable valve operated between two limits, a spring biased toggle linkage including two parts hinged together intermediate their ends, said movable valve having two spaced engaging means which are engaged by the toggle linkage intermediate its ends, bearing means for supporting one end of the toggle linkage, pivot means connected to the movable valve for supporting the other end of the toggle linkage, said spring biased toggle linkage and pivot means constraining the valve in either of its two limit positions until the valve is snapped over to its other limit position.

4. A fluid motor and valve assembly comprising, in combination, cylindrical and piston means forming at least one cylindrical chamber, valve means, valve actuating means, a housing having a first compartment enclosing the valve means and a second compartment enclosing the valve actuating means, said valve means sealing the two compartments from each other, conduit means including the second compartment connecting the valve means to the said cylindrical chamber, actuating means operated by the piston means within said cylindrical chamber and extending into the said second compartment for actuating the valve actuating means, said second compartment having a removable closure to gain access to said valve actuating means, said valve means having a seat member with a flat engaging surface and a rotary valve member with a flat engaging surface slidable relative to each other, said first compartment having a removable closure to gain access to said valve means, said housing having a fluid entrance conduit including the first compartment communicating with the valve means and having a fluid exit conduit communicating with the valve means and atmosphere, said valve means having registering port means alternately governing the flow of fluid from the first compartment to the cylindrical chamber and from the latter to atmosphere, a shaft connected to the valve actuating means in said second compartment and extending through the seat member for turning the valve member relative to the seat member, said registering port means being spaced radially from the shaft and the portion of the valve means radially intermediate the port means sealing the shaft within the second compartment and from the registering port means, said valve means being held against the valve seat member by the fluid pressure in the first compartment.

5. A fluid motor and valve assembly comprising, in combination, cylindrical and piston means forming at least one cylindrical chamber, valve means, valve actuating means, a housing having a first compartment enclosing the valve means and a second compartment enclosing the valve actuating means, said valve means sealing the two compartments from each other, conduit means including the second compartment connecting the valve means to the said cylindrical chamber, actuating means operated by the piston means within said cylindrical chamber and extending into the said second compartment for actuating the valve actuating means, said second compartment having a removable closure to gain access to said valve actuating means, said valve means having a seat member and a valve member slidable relative to each other, said first compartment having a removable closure to gain access to said valve means, said housing having a fluid entrance conduit including the first compartment communicating with the valve means and having a fluid exit conduit communicating with the valve means and atmosphere, said valve means having registering port means alternately governing the flow of fluid from the first compartment to the cylindrical chamber and from the latter to atmosphere, a valve actuating member governed by the valve actuating means in said second compartment and extending through the seat member for actuating the valve member relative to the valve seat member, said valve means sealing the valve actuating member within the second compartment and from the registering port means, said valve means being held against the valve seat member by the fluid pressure in the first compartment.

6. A fluid motor and valve assembly comprising, in combination, cylindrical and piston means forming at least one cylindrical chamber, valve means, toggle valve actuating means, a housing having a first compartment enclosing the valve means and a second compartment enclosing the toggle valve actuating means, said valve means sealing the two compartments from each other, conduit means including the second compartment connecting the valve means to the said cylindrical chamber, actuating means operated by the piston means within said cylindrical chamber and extending into the said second compartment for actuating the toggle valve actuating means, said second compartment having a removable closure to gain access to said toggle valve actuating means, said valve means having a seat member and a valve member slidable relative to each other, said first compartment having a removable closure to gain access to said valve means, said housing having a fluid entrance conduit including the first compartment communicating with the valve means and having a fluid exit conduit communicating with the valve means and atmosphere, said valve means having registering port means alternately governing the flow of fluid from the first compartment to the cylindrical chamber and from the latter to atmosphere, a valve actuating member governed by the valve actuating means in said second compartment and extending through the seat member for actuating the valve member relative to the valve seat member, said valve means sealing the valve actuating member within the second compartment and from the registering port means, said valve means being held against the valve seat member by the fluid pressure in the first compartment, said toggle valve actuating means comprising crank means movable between two limits about an axis, pivot means carried on the crank means at a distance from and on one side of the axis, bearing means positioned on the opposite side of the axis, a spring biased toggle linkage including two parts hinged intermediate their ends, one end of the toggle linkage being pivotally connected to the pivot means and the other end of the toggle linkage bearing upon the bearing means, said crank means having spaced engaging means which are engaged by the toggle linkage for actuating the crank means.

7. A fluid motor and valve assembly comprising, in combination, cylindrical and piston means forming at least one cylindrical chamber, valve means, valve actuating means, a housing having a first compartment enclosing the valve means and a second compartment enclosing the valve actuating means, said valve means sealing the two compartments from each other, conduit means including the second compartment connecting the valve means to the said cylindrical chamber, actuating means operated by the piston means within said cylindrical chamber and extending into the said second compartment for actuating the valve actuating means, detachable connecting means between the piston means and the valve actuating means for detachably connecting the actuating means to the valve actuating means, said second compartment having a removable closure to gain access to said valve actuating means, said valve means having a seat member with a flat engaging surface and a rotary valve member with a flat engaging surface slidable relative to each other, said first compartment having a removable closure to gain access to said valve means, said housing having a fluid entrance conduit including the first compartment communicating with the valve means and having a fluid exit conduit communicating with the valve means and atmosphere, said valve means having registering port means alternately governing the flow of fluid from the first compartment to the cylindrical chamber and from the latter to atmosphere, a shaft connected to the valve actuating means in said second compartment and extending through the seat member for turning the valve member relative to the seat member, said registering port means being spaced radially from the shaft and the portion of the valve means radially intermediate the port means sealing the shaft within the second compartment and from the registering port means, said valve means being held against the valve seat member by the fluid pressure in the first compartment.

8. A fluid motor and valve assembly comprising, in combination, cylindrical means, a detachable head for the cylindrical means, piston means in the cylindrical means and forming with the cylindrical means and said head at least one cylindrical chamber, valve means, valve actuating means, a housing connected to the said head and detachable therewith as a unit, said housing having a first compartment enclosing the valve means and a second compartment enclosing the valve actuating means, said valve means sealing the two compartments from each other, conduit means including the second compartment connecting the valve means to the said cylindrical chamber, actuating means operated by the piston means within said cylindrical chamber and extending into the said second compartment for actuating the valve actuating means, detachable connecting means between the piston means and the valve actuating means for detachably connecting the actuating means to the valve actuating means, and thus enabling the housing and the valve means and the valve actuating means mounted therein and the said head to be detachable as a complete unit from the cylindrical means, said second compartment having a removable closure to gain access to said valve actuating means, said valve means having a seat member with a flat engaging surface and a rotary valve member with a flat engaging surface slidable relative to each other, said first compartment having a removable closure to gain access to said valve means, said housing having a fluid entrance conduit including the first compartment communicating with the valve means and having a fluid exit conduit communicating with the valve means and atmosphere, said valve means having registering port means alternately governing the flow of fluid from the first compartment to the cylindrical chamber and from the latter to atmosphere, a shaft connected to the valve actuating means in said second compartment and extending through the seat member for turning the valve member relative to the seat member, said registering port means being spaced radially from the shaft and the portion of the valve means radially intermediate the port means sealing the shaft within the second compartment and from the registering port means, said valve means being held against the valve seat member by the fluid pressure in the first compartment.

9. A fluid motor and valve assembly adapted to be connected to a fluid supply source comprising, in combination, cylindrical and piston means dividing the cylindrical means into first and second chambers, valve means for controlling the flow of fluid to and from both ends of the cylindrical means to operate the piston means, valve actuating means, a housing having a first compartment enclosing the valve means and a second compartment enclosing the valve actuating means, said valve means sealing the two compartments from each other, first conduit means extending through the housing and cylindrical means and connecting the valve means to the said first cylindrical chamber, second conduit means including said second compartment connecting the valve means to the said second cylindrical chamber, actuating means operated by the piston means within the said second cylindrical chamber and extending into the said second compartment for actuating the valve actuating means, said second compartment having a removable closure to gain access to said valve actuating means, said valve means having a seat member and a valve member movable relative to each other, said first compartment having a removable closure to gain access to said valve means, said housing having a fluid entrance conduit including the first compartment to deliver fluid from the supply source to the valve means and having a fluid exit conduit connecting the valve means to atmosphere, said valve means having registering port means to govern the flow of fluid in the conduits to reciprocally operate the piston means, a valve actuating member governed by the valve actuating means in said second compartment and extending through the seat member for actuating the valve member relative to the valve seat member, said valve means sealing the valve actuating member within the second compartment and from the registering port means, said valve member being held against the valve seat member by the fluid pressure in the first compartment.

10. A fluid motor and valve assembly adapted to be connected to a fluid supply source comprising, in combination, cylindrical and piston means dividing the cylindrical means into first and second chambers, valve means for controlling the flow of fluid to and from both ends of the cylindrical means to operate the piston means, said valve means comprising a seat member having a flat surface and a valve member having an engaging surface adapted to slide relative to said flat surface of the seat member, said seat member having a first port and a second port spaced from each other, said valve means having a fluid exhaust passage communicating with atmosphere, valve actuating means responsive to the piston means for actuating the valve member between two operating positions relative to the seat member, first conduit means connecting the first port of the seat member to the first cylindrical chamber, second conduit means connecting the second port of the seat member to the second cylindrical chamber, a housing having a valve compartment for enclosing the valve means, said engaging surface of the valve member having a channel in continuous communication with the exhaust passage, said valve member upon actuation by the valve actuating means to one of its operating positions connecting the first port in communication with the exhaust passage and the second port in communication with the valve compartment of the housing and said valve member upon actuation by the valve actuating means to its other operating position connecting the second port in communication with the exhaust passage and the first port in communication with the valve compartment of the housing, said housing having a fluid entrance conduit including the valve compartment to deliver fluid from the supply source to the said ports, said valve actuating means having an actuating member extending through the seat member for actuating the valve member relative to the seat member, said valve means sealing the actuating member and the exhaust passage from the valve compartment of the housing, said valve member being held against the seat member by the fluid pressure in the valve compartment of the housing.

11. A fluid motor and valve assembly adapted to be connected to a fluid supply source comprising, in combination, cylindrical and piston means dividing the cylindrical means into first and second chambers, valve means for controlling the flow of fluid to and from both ends of the cylindrical means to operate the piston means, said valve means comprising a seat member having a flat surface and a valve member having an engaging surface adapted to slide relative to said flat surface of the seat member, said seat member having a first port and a second port spaced from each other, said valve means having a fluid exhaust passage communicating with atmosphere, valve actuating means responsive to the piston means for actuating the valve member between two operating positions relative to the seat member, first conduit means connecting the first port of the seat member to the first cylindrical chamber, second conduit means connecting the second port of the seat member to the second cylindrical chamber, a housing having a valve compartment for enclosing the valve means, said housing having a removable closure to gain access to said valve means, said engaging surface of the valve member having a channel in continuous communication with the exhaust passage, said valve member upon actuation by the valve actuating means to one of its operating positions connecting the first port in communication with the exhaust passage and the second port in communication with the valve compartment of the housing and said valve member upon actuation by the valve actuating means to its other operating position connecting the second port in communication with the exhaust passage and the first port in communication with the valve compartment of the housing, said housing having a fluid entrance conduit including the valve compartment to deliver fluid from the supply source to the said ports, said valve actuating means having an actuating member extending through the seat member for actuating the valve member relative to the seat member, said valve means sealing the actuating member and the exhaust passage from the valve compartment of the housing, said valve member being held against the seat member by the fluid pressure in the valve compartment of the housing.

12. A fluid motor and valve assembly adapted to be connected to a fluid supply source comprising, in combination, cylindrical and piston means dividing the cylindrical means into first and second chambers, valve means for controlling the flow of fluid to and from both ends of the cylindrical means to operate the piston means, said valve means comprising a seat member having a flat surface and a valve member having an engaging surface adapted to slide relative to said flat surface of the seat member, said seat member having a first port and a second port spaced from each other, said valve means having a fluid exhaust passage communicating with atmosphere, valve actuating means responsive to the piston means for actuating the valve member between two operating positions relative to the seat member, first conduit means connecting the first port of the seat member to the first cylindrical chamber, second conduit means connecting the second port of the seat member to the second cylindrical chamber, a housing having a valve compartment for enclosing the valve means, said housing having a removable closure to gain access to said valve means, said engaging surface of the valve member having a channel in continuous communication with the exhaust passage, said valve member upon actuation by the valve actuating means to one of its operating positions connecting the first port in communication with the exhaust passage and the second port in communication with the valve compartment of the housing and said valve member upon actuation by the valve actuating means to its other operating position connecting the second port in communication with the exhaust passage and the first port in communication with the valve compartment of the housing, said housing having a fluid entrance conduit including the valve compartment to deliver fluid from the supply source to the said ports, said valve actuating means having an actuating member extending through the seat member for actuating the valve member relative to the seat member, said valve member being readily detachable from the actuating member, said valve means sealing the actuating member and the exhaust passage from the valve compartment of the housing, said valve member being held against the seat member by the fluid pressure in the valve compartment of the housing.

JAMES J. PELOUCH.